US011691206B2

(12) United States Patent
Sterling (10) Patent No.: US 11,691,206 B2
(45) Date of Patent: Jul. 4, 2023

(54) TOOL TIP

(71) Applicant: SECO TOOLS AB, Fagersta (SE)

(72) Inventor: Bjorn Sterling, Soderkoping (SE)

(73) Assignee: SECO TOOLS AB, Fagersta (SE)

( * ) Notice: Subject to any disclaimer, the term of this patent is extended or adjusted under 35 U.S.C. 154(b) by 715 days.

(21) Appl. No.: 16/492,526

(22) PCT Filed: Feb. 13, 2018

(86) PCT No.: PCT/EP2018/053539
§ 371 (c)(1),
(2) Date: Sep. 9, 2019

(87) PCT Pub. No.: WO2018/162185
PCT Pub. Date: Sep. 13, 2018

(65) Prior Publication Data
US 2021/0138561 A1     May 13, 2021

(30) Foreign Application Priority Data

Mar. 10, 2017  (EP) ..................................... 17160317

(51) Int. Cl.
*B23B 51/06*     (2006.01)
(52) U.S. Cl.
CPC .......... *B23B 51/06* (2013.01); *B23B 2231/24* (2013.01); *B23B 2251/02* (2013.01)
(58) Field of Classification Search
CPC ............................. B23B 51/06; B23B 2231/24
See application file for complete search history.

(56) References Cited

U.S. PATENT DOCUMENTS

| 4,704,055 | A | | 11/1987 | Guehring |
| 6,045,301 | A | * | 4/2000 | Kammermeier ........ B23B 51/06 |
| | | | | 408/230 |
| 6,116,825 | A | | 9/2000 | Kammermeier et al. |
| 7,374,374 | B2 | | 5/2008 | Berglow |
| 7,980,795 | B2 | | 7/2011 | Berglow et al. |
| 8,142,116 | B2 | * | 3/2012 | Frejd ....................... B23B 51/02 |
| | | | | 408/230 |
| 2008/0175676 | A1 | | 7/2008 | Prichard et al. |

FOREIGN PATENT DOCUMENTS

| DE | 10016464 A1 | 10/2001 |
| DE | 102014108220 A1 | 12/2015 |
| KR | 20150127686 A * | 11/2015 ............. B23B 51/06 |

* cited by examiner

*Primary Examiner* — Sunil K Singh
*Assistant Examiner* — Reinaldo A Vargas Del Rio
(74) *Attorney, Agent, or Firm* — Corinne R. Gorski (57) ABSTRACT

A tool tip is integral with or removably secured to a tool body and configured to machine a metal object. The tool tip has a tool tip diameter, a rotational axis and at least one coolant duct. The tool tip includes at least one major cutting edge formed at an intersection of a rake face and a first major flank. The rake face forms part of a chip flute. The coolant duct is configured to be in flow communication with discharge orifices located exclusively in the tool tip. The tool tip has an arrangement, such as a row of two or more discharge orifices located exclusively in the rake face of a major cutting edge. The arrangement extends at a non-zero angle relative to the rotational axis.

14 Claims, 5 Drawing Sheets

TOOL TIP

RELATED APPLICATION DATA

This application is a § 371 National Stage Application of PCT International Application No. PCT/EP2018/053539 filed Feb. 13, 2018 claiming priority to EP 17160317.8 filed Mar. 10, 2017.

TECHNICAL FIELD

The present disclosure relates to a tool tip configured to machine a metal object and, more particularly, to such tool tips having coolant ducts.

BACKGROUND

Drilling is a cutting process that uses a drill to cut a hole of circular cross-section in metallic materials. The drill is usually a rotary cutting tool, but can be stationary when the workpiece rotates. The drill is pressed or fed against the workpiece and rotated at rates from hundreds to thousands of revolutions per minute. This forces the cutting edge against the workpiece, cutting off chips from the hole as it is drilled.

Another tool for machining a metal object is an end milling cutter which have cutting teeth at one end, as well as on the sides. The end mill cutter often has flat bottom cutting edges, but also may alternatively include rounded cutting edges or radiused cutters. The end mill cutter has one or more flutes and may be a one-piece tool such as disclosed in for example U.S. Pat. No. 7,374,374 or a multi-piece tool assembly such as disclosed in for example U.S. Pat. No. 7,980,795.

It is advantageous to deliver a coolant closely to a cutting area by using a tool having a coolant supply for minimizing the heat accumulated due to the interaction of the cutting edges with a machined workpiece. The coolant provides lubrication and cooling to the cutting edges and removes the chips from the hole. Such tools allow cutting fluid (either compressed air or a suitable liquid) to be injected through a hollow body of the tool to the cutting area. Conventional techniques for providing lubrication and/or coolant to cutting edges of drills typically involve introducing the coolant via several orifices.

U.S. Pat. No. 6,045,301 discloses a drill having discharge orifices.

It is desirable to provide a tool tip having improved coolant flow.

It is also desirable to provide a tool tip with discharge orifices that facilitate evacuation of the chips along chip flutes.

SUMMARY

According to an aspect of the present invention, a one-piece tool tip is integral with or is configured to be removably secured to a tool body and configured to machine a metal object, the tool tip having a tool tip diameter, a rotational axis and at least one coolant duct, the tool tip comprising at least one major cutting edge formed at an intersection of a rake face and a first major flank, the rake face forming part of a chip flute, the at least one coolant duct being configured to be in flow communication with discharge orifices exclusively in the tool tip, the tool tip has an arrangement, such as a row, of two or more discharge orifices exclusively in the rake face of a major cutting edge, wherein the arrangement extends at a non-zero angle relative to the rotational axis for enhanced flow properties by for instance spreading the orifices radially.

According to another aspect of the present invention, the arrangement follows a substantially straight path or a curved path having three or more discharge orifices in the rake face of the at least one major cutting edge to further improve the flow properties by for instance by increasing the fluid volume.

According to another aspect of the present invention, the arrangement extends along or parallel to the major cutting edge in the rake face to spread the coolant radially evenly.

According to another aspect of the present invention the arrangement is defined by a line intersecting at least two or three discharge orifices to make sure the coolant gets access to the cutting area.

According to another aspect of the present invention, a line intersecting at least three discharge orifices is spaced from the major cutting edge by a distance such that coolant may exit close to the chip generating area.

According to another aspect of the present invention, the distance is small, e.g. 5-15% of the tool tip diameter to further define the closeness to the major cutting edge.

According to another aspect of the present invention, each discharge orifice has a dimension that is 5-15% of the tool tip diameter, which is a suitable compromise between tool tip durability and coolant flow.

According to another aspect of the present invention, each discharge orifice is spaced from the associated major cutting edge by a distance d that is equal to a dimension d of the discharge orifice to further define the closeness to the major cutting edge.

According to another aspect of the present invention, wherein each discharge orifice forms the exit of a curved channel connected to an at least one receiving end or coolant duct, the curved channel improving coolant flow by reducing cavitation.

According to another aspect of the present invention, the arrangement includes 3 to 6 discharge orifices to increase the total flow area.

According to another aspect of the present invention, all discharge orifices in the arrangement have the same diameter to simplify manufacture of the tool tip.

According to another aspect of the present invention, all discharge orifices in the arrangement are spaced from the associated major cutting edge by the same distance, which is favorable during regrinding operations.

According to another aspect of the present invention, the tool tip has at least two major cutting edges and a majority of discharge orifices are located axially forwards of a line intersecting radially outer ends of the major cutting edges.

According to another aspect of the present invention, the tool tip is fused to the tool body such that the rear end of the tool tip and a front end of a tool body are joined together physically, e.g. by melting or heating, to form a twist drill or helix drill.

According to another aspect of the present invention, the tool tip is configured to be detachably secured to a tool body by means of a coupling such as a bayonet coupling and/or a screw coupling such that the at least one coolant duct in the tool tip aligns with the at least one coolant duct in the tool body.

BRIEF DESCRIPTION OF THE DRAWINGS

The features and advantages of the present invention are well understood by reading the following detailed description in conjunction with the drawings in which.

Each figure in the drawings is drawn to scale. However, sizes of the tool tip or components thereof maybe reduced or enlarged by a certain amount.

DETAILED DESCRIPTION

Referring now to the drawings, wherein similar reference characters designate corresponding parts throughout the several views, there is generally indicated a tool at 10 and 10', and at 16 and 16' a tool tip, e.g. a drill tip according to a first embodiment and a second embodiment of the present invention, for use in metal drilling operations.

Figures 1A, 1C:
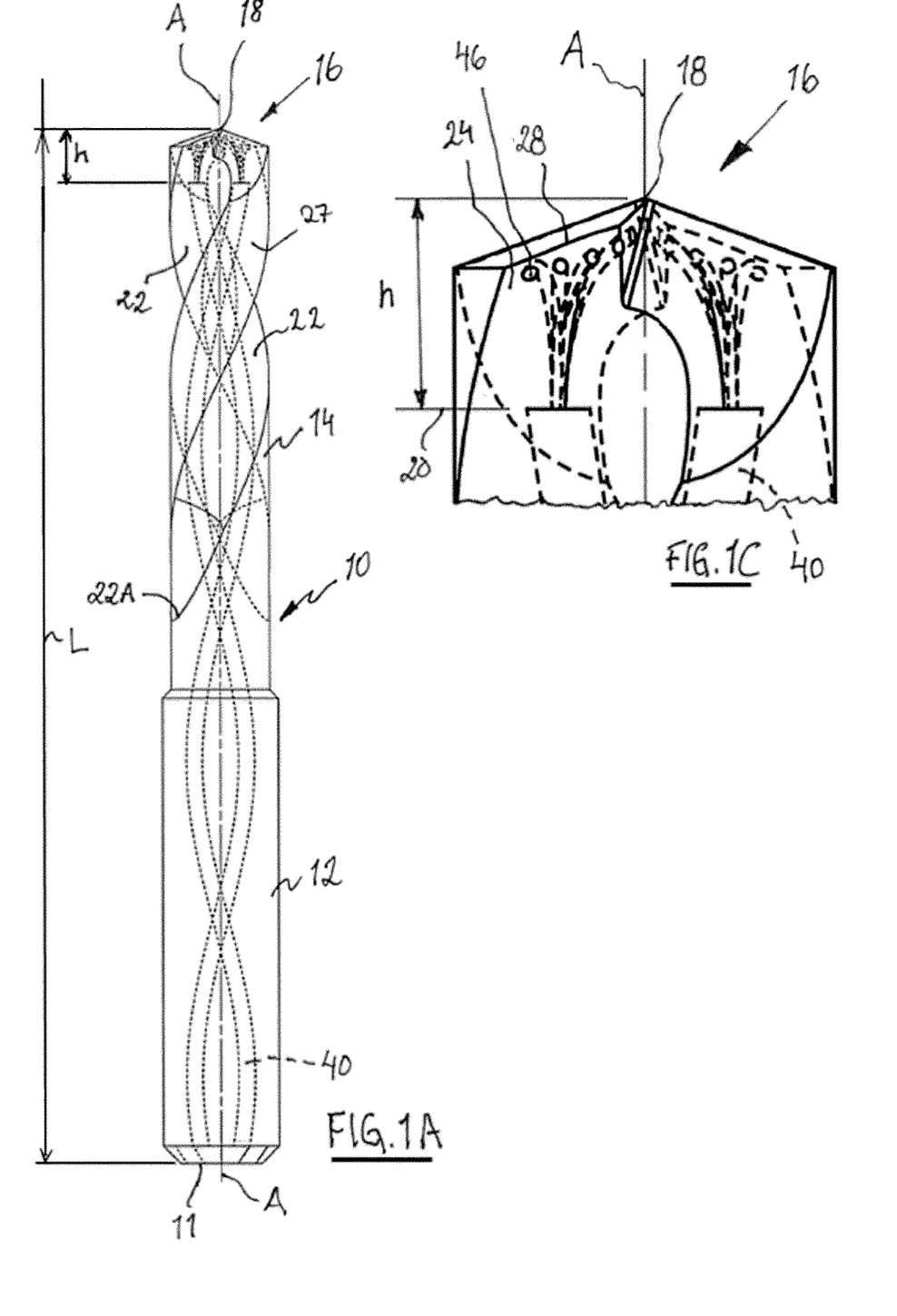
FIG. 1A is a side view of a twist drill according to an aspect of the present invention.
FIG. 1C is an enlarged side view of a front portion of the twist drill in FIG. 1A comprising a tool tip.
Figure 1B:
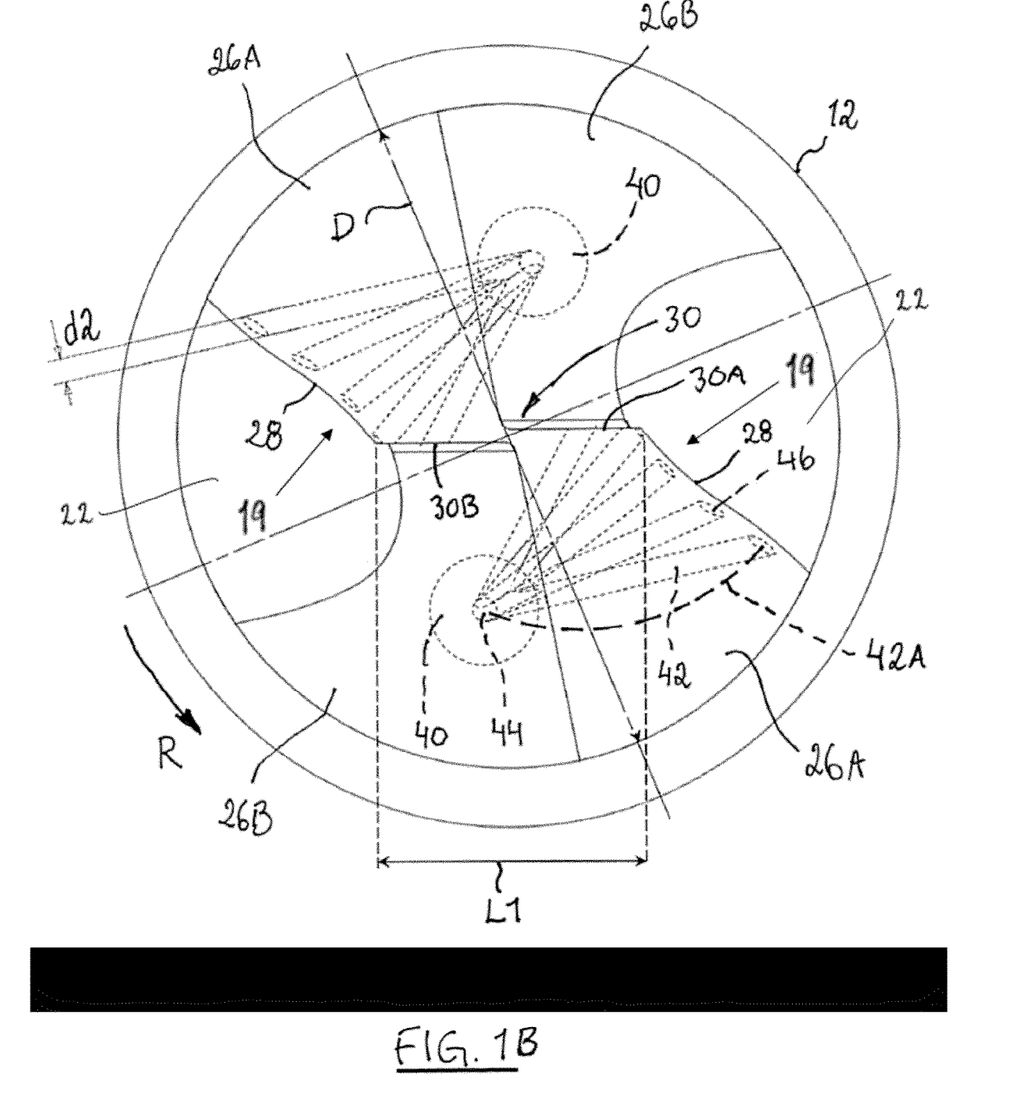
FIG. 1B is an enlarged top view of the drill in FIG. 1A.
Figure 1D:
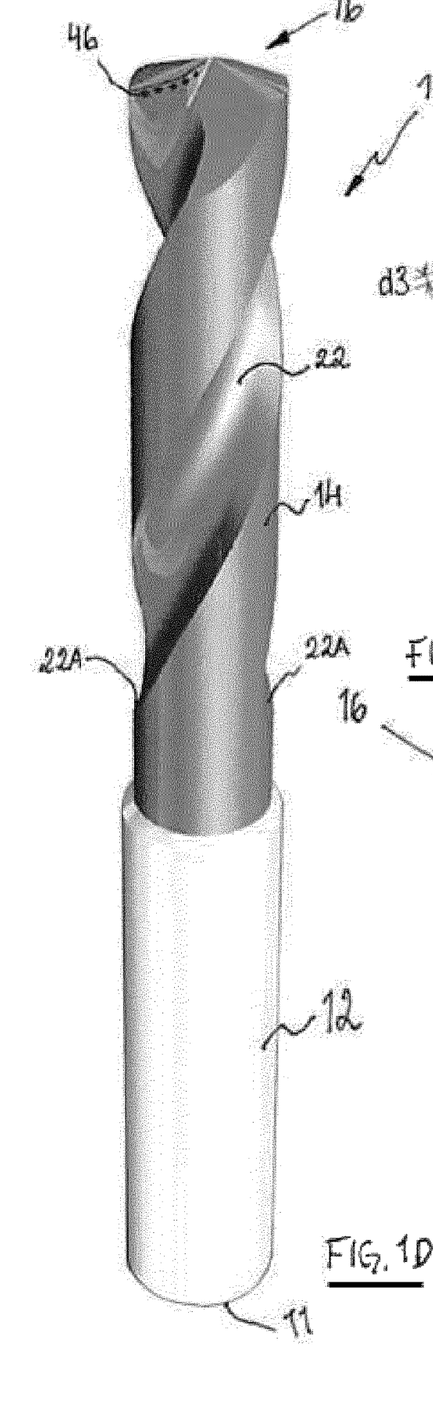
FIG. 1D is a perspective view the twist drill in FIG. 1A.
Figure 1E:
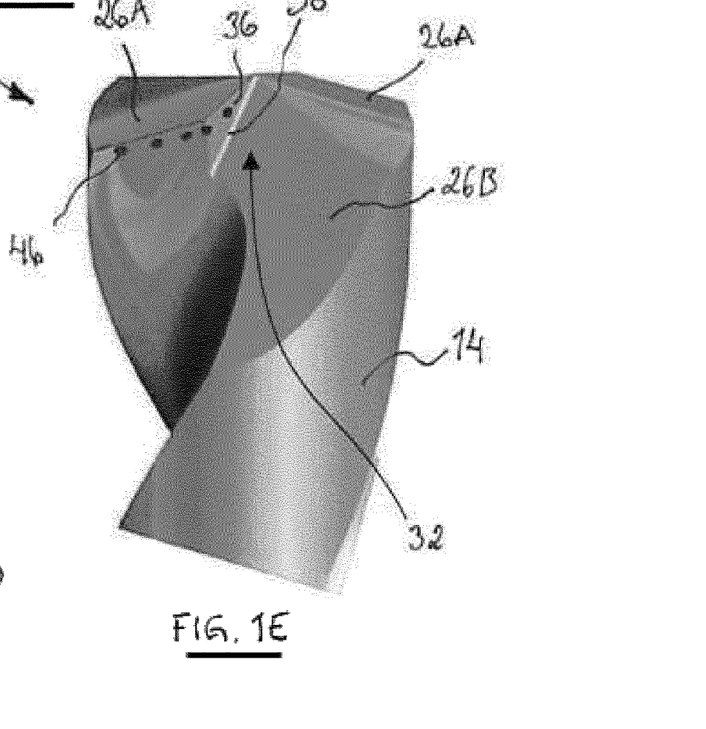
FIG. 1E is an enlarged perspective view of the front portion of the twist drill in FIG. 1D comprising a tool tip.

An embodiment of a one-piece tool, e.g. a drill 10 comprises a shank 12 having a rear end 11 and a tool body, e.g. a drill body 14 having a tool tip, e.g. a drill tip 16 as seen in FIGS. 1A-1F. The drill 10 is preferably a twist drill comprising a body, preferably of cemented carbide or high speed steel. The drill may be coated with at least one layer or coating. The number of wear resistant coatings may be one or more. The layer may be deposited at least on the drill tip 16. The drill tip 16 has a maximum diameter D. The drill is intended to rotate in the direction R (FIG. 1B).

The drill body 14 comprises a fluted portion having at least one or at least two chip flutes 22 that each ends forwardly in a face or rake face 24. The rake face 24 intersects a first major flank 26A to form a major cutting edge 28. The major cutting edge 28 extends radially or substantially radially as seen in FIG. 1B.

An axial extension along a central longitudinal axis or rotational axis A of the drill tip 16 can be defined by a height h that is the distance from a front point or front end 18 of the twist drill to a drill tip rear end 20, in direction towards the shank 12. The height h may be 30 to 200% of the diameter D, preferably 40 to 70%.

The shank and the drill body are preferably, at least partly, cylindrical about a longitudinal centre axis that usually coincides with the rotational axis A, and for the ease of disclosure both axes will be depicted hereinafter as the rotational axis A or A'.

The twist drill preferably has the maximum diameter D of from about 2 to about 20 mm. The shank 12 is suitable for insertion into a holder (not shown). The twist drill has a total length L. A quota L/D may be chosen within a range of 7 to 40. The drill body 14 may be made from a uniform one-piece unit or by multiparts fused together. An example of the latter is that the shank and a portion of the drill body can be pressed, and the remainder of the tool body except for the tool tip can be extruded while the tool tip is made by additive manufacturing.

The twist drill tip or tool tip 16 may have two identical cutting segments 19 and may have two identical flutes 22. The cutting segments 19 and flutes 22 are equally spaced circumferentially about the longitudinal centre axis or rotational axis A. The rotational axis thus defines a forward-to-rear direction of the twist drill 10, with the drill tip 16 being at the forward side. The two flutes 22 extend helically from the drill tip 16 to an end 22A in the vicinity of the shank 12. A typical value for the helix angle in the axial mid region of the drill body 14 is 20° to 40°. Two lands 27 are created when the flutes 22 are produced in a drill blank, which lands also extend helically. The lands 27 bridge the flutes 22 in the circumferential direction of the twist drill. Each cutting segment 19 has a first segment relief surface or first major flank 26A, which extends radially outwardly, away from the rotational axis A to a peripheral surface of the land 27 and may have a second segment relief surface or second major flank 26B. The first major flank 26A forms a first relief surface and the second major flank 26B forms a second relief surface. A chisel edge 30 may be located at the front end of the twist drill 10. The chisel edge 30 may have a length L1 of 0.5 to 10 mm, i.e. substantially the same as the web thickness of the drill. The chisel edge 30 may be defined by two chisel sub-edges 30A and 30B. Each chisel sub-edge 30A and 30B is formed at an intersection of an adjacent first major flank 26A and a gash 32. The gash 32 may extend axially rearwards of a line Y intersecting the radially outer ends of the major cutting edges 28 in a view like FIG. 1F. The flute 22 may meet the first major flank 26A at the major cutting edge 28.

The major cutting edge is shown partly concave in top view (FIG. 1B) but may be straight or convex. The two major cutting edges 28 form an obtuse point angle of 118 to 170°, i.e. each cutting edge may form 59 to 85° with the rotational axis A. Alternatively, the major cutting edges may extend approximately parallel to each other. Each chisel sub-edge 30A and 30B may connect directly to the associated major cutting edge 28 at a convex connection point. Alternatively, an intermediate cutting edge (not shown) may form a transition area between the chisel sub-edge 30 and the associated major cutting edge 28. The intermediate cutting edge may be substantially straight or curved and may connect to the chisel sub-edge and the major cutting edge via radii.

The gash 32 has first and second gash surfaces 36, 26B. The second gash surface may be constituted by the second major flank 26B or by an additional major flank (not shown). The first and second gash surfaces 36, 26B may be perpendicular to each other, or form an obtuse angle of preferably 91 to 93°. The first gash surface 36 may be planar. The first gash surface 36 meets the first major flank 26A at the chisel sub-edge 30A or 30B. The second gash surface 26B may be planar or concave, and may connect to the chip flute 22 and to the periphery of the fluted portion. The first and second gash surfaces 36, 26B meet at a line or curve 38 which substantially forms an axial web thinning angle with the tool tip rotational axis A. This angle may be in the range of 40 to 50°. An angle of for example about 44° together with a web or core diameter of 0.4×D at the drill tip 16 creates a small, easily removable chip. The web or core diameter of 0.4×D is measured closest to the tip 16 however axially distant from the gashes 32.

The chip flutes 22 may be polished to a surface fineness Ra of more than 0.001 μm but less than 0.1 μm, along at least at 80% of the axial extension of the flute from the drill tip. Such surface fineness makes flow of chips and liquid uninterrupted.

The rake face is the surface over which the chip, formed in the cutting process, slides. The rake face 24 forms part of the associated chip flute 22 by being about the axially forwardmost 4 millimeters thereof. The rake angle is preferably chosen positive for the drills of the present disclosure.

The twist drill 10 is provided with coolant ducts 40, which are interior channels for coolant (typically under pressure), that run helically from inlets at the rear end 11 of the shank 12 to the rear end 20 of the drill tip 16 (FIG. 1C). The ducts may run along a portion of the axial length of the fluted portion and all of the axial length of the shank 12. The ducts 40 are in fluid communication with a plurality of coolant channels 42 in the drill tip. The coolant channels 42 may be curved. All or some of the coolant channels 42 may diverge from each other in the direction towards the associated rake face 24, as seen in FIG. 1B. One or more radially outermost coolant channels exiting in the associated rake face 24 may be curved such that a center line 42A of the coolant channel (as depicted by a dashed line in FIG. 1B) at a delivery end forms an angle with the associated rake face 24. In a top view like FIG. 1B such an angle may be chosen to be perpendicular or substantially perpendicular to the major cutting edge to avoid forcing the chip towards and damaging the generated hole wall in the workpiece.

Each coolant channel 42 may have a receiving end 44, through which coolant enters from the ducts 40, and a delivery end or a discharge orifice 46. The receiving end 44 may be common for more than one coolant channel 42. As best seen in FIG. 1C the receiving end 44 may be common for all coolant channels. Coolant passes through the coolant channel 42 exiting the discharge orifice 46 exclusively in the rake face 24 in the vicinity of the major cutting edge 28 for transport of fluid to wash away chips and to cool and lubricate the twist drill. The receiving end 44 may be of smaller dimension, e.g. the diameter, than the dimension, e.g. the diameter, of the duct 40 such that alignment of them is facilitated at fusing.

The receiving end 44 of each coolant channel 42 may be positioned exclusively axially rearwardly of the second major flank 26B, when seen in a top view as in FIG. 1B.

By arranging spaced apart discharge orifices exclusively in the rake face 24 in the vicinity of the major cutting edge 28 in the tool tip of the present invention the flow of fluid may be concentrated at the most optimal location without any undesirable leakages.

The tool tip has one or at least one arrangement or row of two or more discharge orifices 46 in the rake face of the major cutting edge 28, wherein the arrangement or row may extend at a non-zero angle α relative to the rotational axis A. The arrangement or row may form the same angle with the rotational axis as the angle formed by the major cutting edge 28 with the rotational axis, e.g. each arrangement or row may form 59 to 85° with the rotational axis A.

Figure 1F:
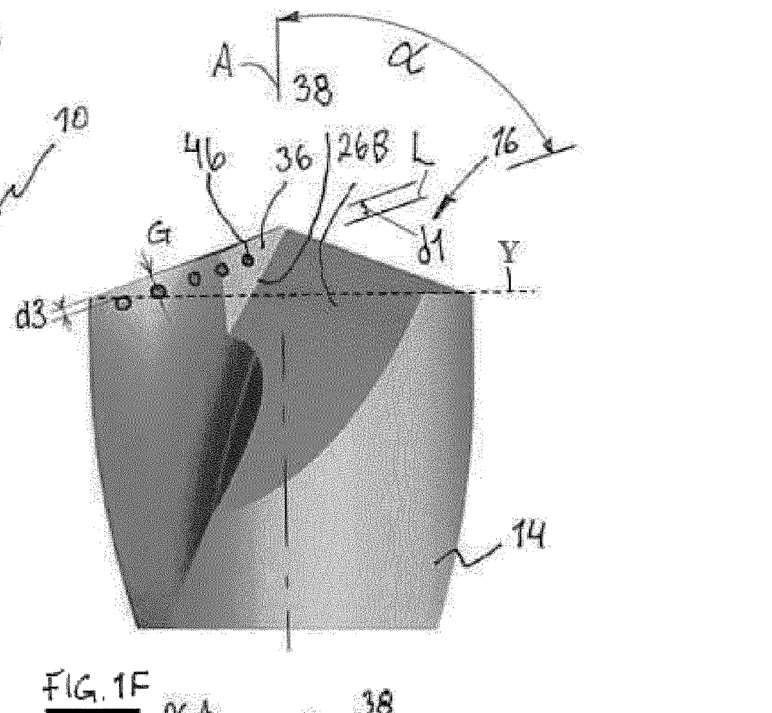
FIG. 1F is an enlarged side view of the front portion of the twist drill in FIG. 1D comprising a tool tip.

The arrangement may be straight or substantially straight, in a side view as shown in FIG. 1F, to form the row. However, if the tool tip is made for or on a ball nose end mill, or similar, the arrangement may follow a curved path, e.g. such as an arched path, of a major cutting edge but at a distance therefrom (not shown). Then at least a portion of the arrangement can be defined by a curvature that substantially matches the curvature of the major cutting edge. The non-zero angle relative to the rotational axis is then defined by a line intersecting at least the radially innermost discharge orifice and at least the radially outermost discharge orifice.

Each arrangement may have three or more discharge orifices 46 in the rake face of the major cutting edges. Each arrangement may extend along the major cutting edge 28 in the rake face 24. Each arrangement may be defined by a line L intersecting at least three discharge orifices 46 (FIG. 1F). The line L that intersects at least three discharge orifices 46 may be spaced from the major cutting edge by a small distance d1. The small distance d1 may be 5-15% of the drill tip diameter D.

Each discharge orifice 46 may have a dimension d2 (as seen in FIG. 1B) such as a diameter that may be 5-15% of the tool tip diameter D. The tool tip diameter D may be 2 to 20 mm. The dimension d2 may be 0.2 to 1 mm.

Each discharge orifice 46 may be spaced from an adjacent discharge orifice by more than the dimension d2 but less than three times the dimension d2.

Each discharge orifice 46 may be positioned in the vicinity of the associated major cutting edge 28, i.e. it may be spaced from the associated major cutting edge 28 by a shortest distance d3 that may be equal to the dimension d2 of the discharge orifice 46.

Each discharge orifice 46 may form the exit of the curved channel 42 connected to the at least one coolant duct 40 in the drill body.

Each arrangement may include 3 to 6 discharge orifices to increase the total flow area in relation to one or two discharge orifices. This means that for a tool tip with two major cutting edges there will be not less than 6 discharge orifices and not more than 12 discharge orifices.

All discharge orifices 46 in the arrangement may have the same diameter. All discharge orifices in the arrangement may be spaced from the associated major cutting edge 28 by the same spacing or distance d3.

A shortest distance G, perpendicular to the major cutting edge 28, is shown in FIG. 1F that defines the allowance where regrinding of the drill tip can be performed before reaching the discharge openings. The shortest distance G may be 5-15% of the drill tip diameter D. The shortest distance G is normally equal to the shortest distance d3.

Table 1 below discloses examples of some conceivable combinations of hole size, number of holes per major cutting edge 28 and shortest distance d3, with respect to different drill diameters.

TABLE 1

| Drill diameter D (mm) | Hole diameter d2 (mm) | Holes per major cutting edge | Distance d3 (mm) |
| --- | --- | --- | --- |
| 2 | 0.2 | 3 | 0.2 |
| 4 | 0.25 | 4 | 0.25 |
| 6 | 0.3 | 5 | 0.3 |
| 8 | 0.4 | 5 | 0.4 |
| 10 | 0.5 | 5 | 0.5 |
| 12 | 0.6 | 5 | 0.6 |
| 14 | 0.7 | 5 | 0.7 |
| 16 | 0.8 | 5 | 0.8 |
| 18 | 0.9 | 5 | 0.9 |
| 20 | 1 | 6 | 1 |

A majority of discharge orifices 46 may be located axially forwards of the line Y intersecting the radially outer ends of the major cutting edges 28. The line Y is typically perpendicular to the rotational axis A. As seen in FIG. 1F there are four discharge orifices located axially forwards of the line and one discharge orifice located axially rearwards of the line.

The rake face 24 may be intersected by the line Y.

The tool tip may have two rows (not shown) of discharge orifices in the arrangement exiting in the same flute. The two rows may then extend parallel to each other. The number of holes may then be twice as many as compared with only one row. The discharge orifices may then be staggered to maintain durability of the tool tip.

At least one discharge orifice may be located in each first gash surface 36 to improve central flushing. At least one discharge orifice may be located axially below the convex connection point, i.e. partially in the first gash surface 36 and partially in the flute 22.

The discharge orifices in an arrangement may be positioned evenly, such as at the same distance from adjacent orifices, or unevenly.

The drill tip 16 of the twist drill 10 may be or become integral with the drill body. Suitably, the drill tip 16 is made through injection molding, precision casting, or additive manufacturing such as metal 3D printing processes which use binders, or fully dense metal processes like selective laser sintering (SLS) or direct metal laser sintering (DMLS). The latter technology uses a high power laser to fuse small particles of metal powders into a drill tip that has the described three dimensional shape. The laser selectively fuses the powdered metal by scanning the cross-sections (or layers) generated by a three dimensional modeling program on the surface of a powder bed. After each cross-section is scanned, the powder bed is relatively lowered by one layer thickness. Then a new layer of material is applied on top and the process is repeated until the drill tip is completed. One advantage with additive manufacturing of the drill tip is that the coolant channels can be made curved such to avoid plugging of any straight holes.

The drill tip 16 in turn may be fused to the drill body 14 such that the rear end 20 of the drill tip and a front end of the drill body are joined together physically, e.g. by melting or heating. Preferably the flutes 22 are already manufactured in both elements and can be aligned before fusing starts.

The rear end 20 of the drill tip may be planar and normal to the axis A as proposed in FIG. 1C, but may alternatively be concave or convex to form fit with a complementary shape at the front end of the drill body.

Referring now to the drawings FIGS. 2A-2H, wherein similar reference characters designate corresponding parts throughout the several views, there is generally indicated a tool, e.g. a drill at 10' and at 16' a tool tip, e.g. a drill tip according to a second embodiment of the present invention, for use in metal drilling operations. The general directing of a coolant in the vicinity of cutting edges is the same as described above in connection with the first embodiment of the present invention, except where otherwise noted.

Figure 2A:
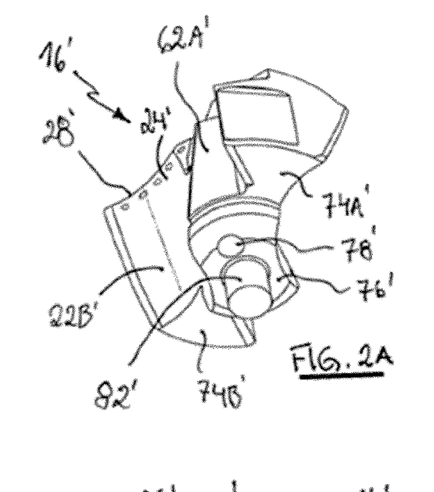
FIG. 2A is a bottom, perspective view of a tool tip according to another aspect of the present invention.
Figures 2B, 2D:
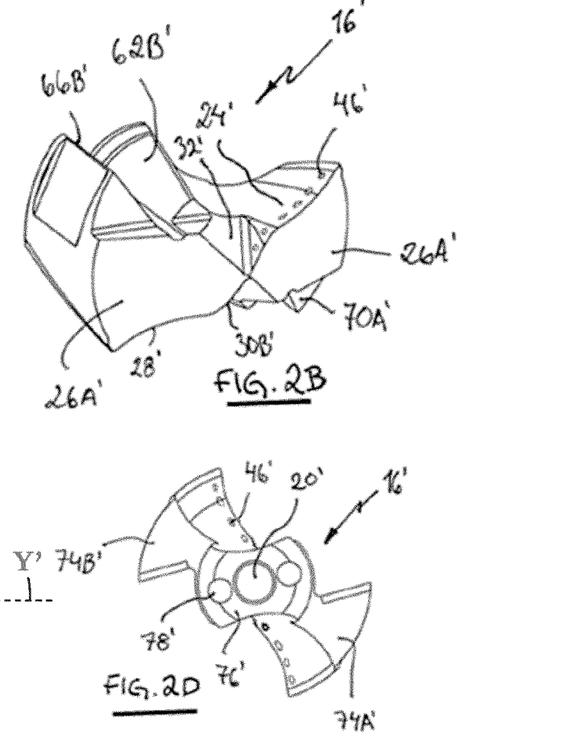
FIG. 2B is a top, perspective view of the tool tip in FIG. 2A.
FIG. 2D is a bottom view of the tool tip in FIG. 2A.
Figure 2C:
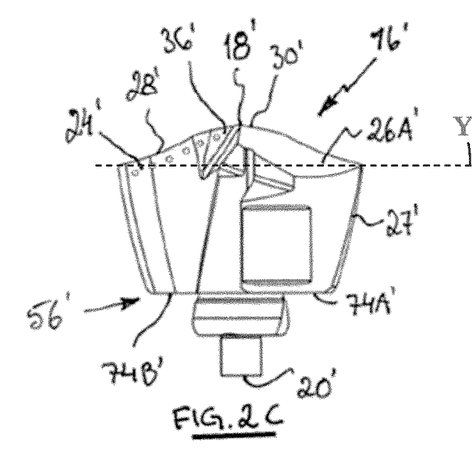
FIG. 2C is a side view of the tool tip in FIG. 2A.
Figure 2E:
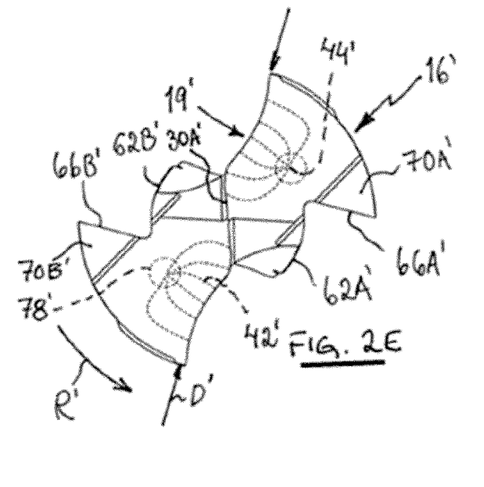
FIG. 2E is a top view of the tool tip in FIG. 2A.

An embodiment of a drill 10' comprises a shank having a rear end (not shown) and a drill body 14' having a detachably secured or exchangeable drill tip 16' as seen in FIGS. 2A-2H. The drill 10' is preferably a twist drill. The drill body is preferably made of steel or cemented carbide. The drill tip 16' is a monobloc or one-piece unit and preferably made of a hard material such as cemented carbide. The drill tip may be coated with at least one layer or coating. The drill tip 16' has a maximum diameter D'. The drill is intended to rotate in the direction R' (FIG. 2E).

The drill body 14' (FIG. 2G) comprises a fluted portion having at least two chip flutes 22A' that each ends forwardly at a space 58'.

Figure 2F:
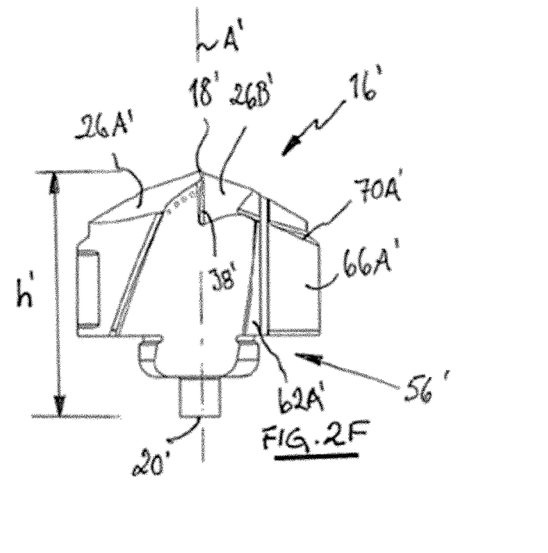
FIG. 2F is another side view of the tool tip in FIG. 2A but rotated turned 90° about its axis relative to the view shown in FIG. 2C.

An axial extension along a rotational axis A' of the drill tip 16' can be defined by a height h' as the distance from a front point or front end 18' of the drill tip to a drill tip rear end 20' (FIG. 2F). The height h' may be 30 to 200% of the diameter D', preferably 70 to 150%.

At its front end the drill body 14' has a coupling portion 52' with two coupling legs 54A', 54B' projecting in the axial direction of the drill body, and arranged on opposite sides of the a central longitudinal axis or rotational axis A' of the drill body.

The drill tip 16' has a coupling portion 56', which may be designed for engagement with the coupling portion 52' of the drill body and which may be receivable in the space 58' between the coupling legs 54A', 54B' of the coupling portion of the drill body.

Internal gripping surfaces 60A', 60B' may be arranged in the space 58' of the coupling portion 56' of the drill body, which may be designed for engagement with corresponding external gripping surfaces 62A', 62B' of the coupling portion of the drill tip. The respective coupling leg 54A', 54B' may be provided with a stop surface 64A', 64B' intended to transfer torque from the drill body to the drill tip. The stop surface may be designed for abutment against a corresponding stop surface 66A', 66B' of the coupling portion of the drill tip. The stop surface may extend parallel or substantially parallel with the rotational axis A' of the drill body or, starting from an axially rear end of the stop surface, it may be inclined forward in the intended machining direction of rotation R of the drill body.

The coupling portion 56' of the drill tip may be rotatable in the space 58' of the coupling portion of the drill body about the rotational axis of the drill tip. The coupling portion 56' of the drill tip may be rotatable in the space 58' to and fro between a free position and an engagement position. In the free position the stop surfaces 66A', 66B' of the coupling portion of the drill tip do not abut against the corresponding stop surfaces 64A', 64B' of the coupling legs 54A', 54B' and the gripping surfaces 62A', 62B' of the drill tip may be not in holding engagement with the corresponding gripping surfaces 60A', 60B' of the drill body. In the engagement position, the stop surfaces 66A', 66B' of the coupling portion of the drill tip abut against the corresponding stop surfaces 64A', 64B' of the coupling legs and the gripping surfaces 62A', 62B' of the drill tip may be in holding engagement with the corresponding gripping surfaces 60A', 60B' of the drill body.

The respective coupling leg 54A', 54B' may be provided with a shoulder 68A', 68B' protruding from the stop surface 64A', 64B' of the coupling leg. The drill tip 16' may be provided with two shoulders 70A', 70B' that face the front end of the drill tip and that may be arranged on opposite sides of the rotational axis of the drill tip. The shoulders 70A', 70B' may border on a respective one of the stop surfaces 66A', 66B' of the coupling portion of the drill tip. The shoulders 70A', 70B' may be arranged to extend in under a respective one of the shoulders 68A', 68B' of the coupling legs 54A', 54B' of the drill body when the coupling portion 56' of the drill tip is in the engagement position in the space 58' of the coupling portion of the drill body.

Figures 2G, 2H:
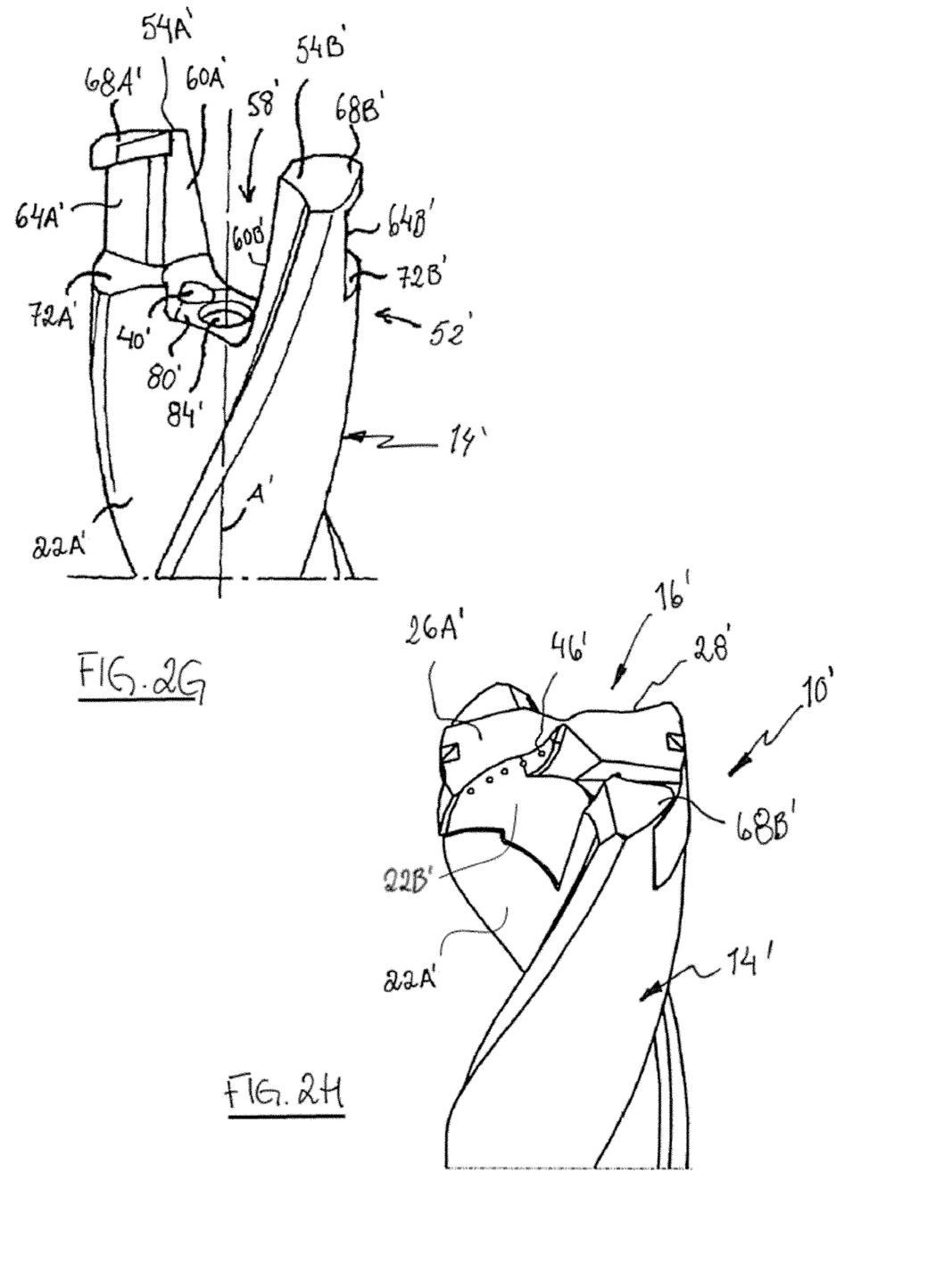
FIG. 2G is a top, perspective view of a front portion of a drill body suitable to hold the tool tip shown in FIGS. 2A-2F.
FIG. 2H is a top, perspective view of a front portion of a drill when the tool tip shown in FIGS. 2A-2F has been mounted to the drill body shown in FIG. 2G.

The internal gripping surfaces 60A', 60B' of the coupling portion of the drill body may be arranged on the inside of a respective one of the coupling legs 54A', 54B' at the axial level of the stop surface 64A', 64B' of the coupling leg, as best seen in FIG. 2G.

The external gripping surfaces 62A', 62B' of the coupling portion of the drill tip may be arranged corresponding to the axial level of the stop surfaces 66A', 66B' of the drill tip (FIG. 2F).

In the respective coupling leg 54A', 54B', the stop surface 64A', 64B' of the coupling leg borders on a support surface 72A', 72B' extending perpendicularly or substantially perpendicularly to the rotational axis A' of the drill body. The support surface 72A', 72B' may be designed for abutment against a corresponding support surface 74A', 74B' of the coupling portion 56' of the drill tip in order to carry axial forces. The shoulder 68A', 68B' that borders on the stop surface 64A', 64B' extend out over this support surface 72A', 72B', i.e. they extend forwardly in the direction R'.

The drill tip 16' may be symmetrically arranged about the diameter D' measure, as seen in FIG. 2E. At its front end, the drill tip has a cutting portion, which in a conventional manner comprises at least one cutting edge 28' extending in the radial direction of the drill tip. In the illustrated example, the drill tip 16' is provided with two cutting edges 28'. A clearance surface or first major flank 26A' is arranged behind the respective cutting edge 28', as seen in the machining direction of rotation R' of the drill tip. In the illustrated example, at least one coolant duct 78' (and preferably at least two coolant ducts) opens into bottom surface 76' on an underside of the drill tip. The coolant duct 78' may extend parallel or non-parallel to the axis A' of the drill tip. When the drill tip 16' is attached to the drill body 14', the coolant duct 78' is connected to a corresponding coolant channel 40' which extends through the drill body and which opens into a bottom surface 80' of the space 58' between the coupling legs 54A', 54B' of the drill body (see FIG. 2G). The distance in axial direction between the bottom surface 80' of the space 58' and the support surfaces 72A', 72B' of the drill body is suitably equal to the distance in axial direction between the bottom surface 76' of the drill tip 16' and the support surfaces 74A', 74B' of the drill tip, so that there is a minimum gap between these bottom surfaces 80', 76' when the support surfaces 74A', 74B' of the drill tip abut against the support surfaces 72A', 72B' of the drill body. A minimum gap, possibly combined with a seal, could reduce leakage of coolant.

The drill tip may be provided with a centrally located guide pin 82' at its bottom surface 76'. The guide pin 82' protrudes in the axial direction of the drill tip and is arranged to be received in a corresponding central recess 84' in the bottom of the space 58' between the coupling legs 54A', 54B' when the coupling portion 56' of the drill tip is inserted into the space 58'. Thereby, the initial centering of the coupling portion 56' of the drill tip in the space is facilitated in connection with the mounting of the drill tip to the drill body. The guide pin 82' may extend axially about 5 to 25% of the height h'.

The details of the bayonet coupling of the tool tip 16' to the tool body 14' are more closely described in U.S. Pat. No. 8,142,116 which is hereby incorporated by reference.

Like in the first embodiment of the present invention the rake face 24' intersects a first major flank 26A' to form a major cutting edge 28'. The shank and the drill body are preferably, at least partly, cylindrical about a longitudinal rotational axis that usually coincides with the rotational axis A'. The twist drill preferably has a maximum diameter D' of from about 10 to about 20 mm. The shank is suitable for insertion into a holder (not shown). The twist drill may have a total length to diameter quota within a range of 8 to 13.

The twist drill 10' or drill tip 16' may have two identical cutting segments 19' and may have two identical flutes 22B'. The cutting segments 19' and flutes are equally spaced circumferentially about the longitudinal centre axis or rotational axis. The rotational axis thus defines a forward-to-rear direction of the twist drill 10', with the drill tip 16' being at the forward side. The two flutes 22B' extend helically and continuously from the drill tip 16' to an end (not shown) in the vicinity of the shank when the drill tip is mounted to the drill body. A typical value for the helix angle in the axial mid region of the drill body 14' is 20° to 40°. Each cutting segment 19' has a first major flank or first segment relief surface 26A', which extends radially outwardly, away from the rotational axis A' to a peripheral surface of a land or margin 27' and may have a second major flank or second segment relief surface (not shown). The first major flank 26A' forms a first relief surface and the second major flank may form a second relief surface. A chisel edge 30' is located at the front end of the twist drill 10'. The chisel edge 30' may have a length that substantially corresponds to the web thickness of the drill tip. The chisel edge 30' is defined by two chisel sub-edges 30A' and 30B'. Each chisel sub-edge 30A' and 30B' is formed at an intersection of an adjacent first major flank 26A' and a gash 32'. The gash 32' may extend axially rearwards of a line Y' intersecting the radially outer ends of the major cutting edges 28'. The flute 22B' meets first major flank 26A' at the major cutting edge 28'. The major cutting edge is shown partly concave in top view but may be straight or convex. The two major cutting edges 28' form an obtuse point angle of 118 to 170°, i.e. each cutting edge may form 60 to 75° with the rotational axis A. Alternatively, the major cutting edges may approximately extend parallel to each other. Each chisel sub-edge 30A' and 30B' may connect via an intermediate cutting edge to the associated major cutting edge 28' at a transition area between the chisel sub-edge 30' and the associated major cutting edge 28'. Alternatively, each chisel sub-edge may connect directly to the associated major cutting edge at a convex connection point (not shown). The intermediate cutting edge may be curved or substantially straight and may connect to the chisel sub-edge 30' and the major cutting edge 28' via radii.

The gash 32' has first and second gash surfaces 36', 26B'. The second gash surface may be constituted by a second major flank (not shown). The first and second gash surfaces 36', 26B' may be perpendicular to each other, or form an obtuse angle of preferably 91 to 93°. The first gas h surface 36' may be planar or curved. The first gash surface 36' meets the first major flank 26A' at the chisel sub-edge 30A' or 30B'. The second gash surface 26B' may be planar or concave, and may connect to the chip flute 22B'. The first and second gash surfaces meet at a line or curve 38' which substantially forms an axial web thinning angle with the drill tip axis A'. This angle may be in the range of 40 to 50°. An angle of for example about 44° together with a web or core diameter of 0.4×D a t the drill tip 16' creates a small, easily removable chip.

The chip flutes 22A' and/or 22B' may be polished to facilitate flow of chips and coolant.

The rake face 24' forms part of the associated chip flute 22B' by being the axially forwardmost millimeter thereof. The rake angle is preferably chosen positive for the drills of the present disclosure.

The twist drill 10' is provided with coolant ducts 40', which are interior channels for coolant under pressure, that run helically from inlets at the rear end of the shank towards the rear end 20' of the drill tip 16'. The ducts may run along substantially all of the axial length of the fluted portion and all of the axial length of the shank. When the drill tip 16' is mounted to the drill body the combination of ducts 40' and 78' are in fluid communication with the plurality of coolant channels 42' (depicted by dashed lines in FIG. 2E). The coolant channels 42' may be curved. All or some of the coolant channels 42' may be connected to the associated duct 78' and spaced from each other when measured in the vicinity of the associated rake face 24', as seen in FIG. 2E. One or more radially outermost coolant channels exiting in the associated rake face 24' may be curved such that the center line of the coolant channel at a delivery end forms an angle with the associated rake face 24'. In a top view like FIG. 2E such an angle may be chosen to be perpendicular or substantially perpendicular to the major cutting edge to avoid forcing the chip towards and damaging the generated hole wall in the workpiece.

Each coolant channel 42' may have a receiving end 44' through which coolant enters from the ducts 78' and exits at the delivery end or a discharge orifice 46'. The receiving end 44' may be common for more than one coolant channel 42'. As best seen in FIG. 2E the receiving end 44' is common for all coolant channels. Coolant passes through the coolant channel 42' exiting the discharge orifice 46' exclusively in the rake face 24' in the vicinity of the major cutting edge 28' for transport of fluid to wash away chips and to cool and lubricate the twist drill. The receiving end 44' may be of smaller dimension, e.g. the diameter, than the dimension, e.g. the diameter, of the duct 78' such that alignment of them is facilitated.

The receiving end 44' of each coolant channel 42' may be positioned exclusively axially rearwardly of the first major flank 26A', when seen in a top view as in FIG. 2E.

By arranging discharge orifices exclusively in the rake face 24' in the vicinity of the major cutting edge 28' in the drill tip of the present invention the flow of fluid is concentrated at the most optimal location without any undesirable leakages elsewhere. Furthermore, the axial locking of the drill tip to the drill body is favorable since high coolant pressure otherwise could separate the drill tip from the drill body.

The drill tip has at least one arrangement of two or more discharge orifices 46' in the rake face of the major cutting edge 28', wherein the arrangement extends at a non-zero angle relative to the rotational axis A'. The arrangement may form the same angle with the rotational axis as the angle formed by the major cutting edge 28' with the rotational axis, e.g. each arrangement may form 59 to 85° with the rotational axis A'.

Each arrangement may have three or more discharge orifices 46' in the rake face of the major cutting edge. Each arrangement may extend along the major cutting edge 28' in the rake face 24'. Each arrangement may be defined by a line intersecting at least three discharge orifices 46'. That line may intersect at least three discharge orifices 46' and is spaced from the major cutting edge by a small distance. The small distance may be 5-15% of the drill tip diameter D'.

Each discharge orifice 46' may have a dimension such as a diameter that is 5-15% of the drill tip diameter D' and that dimension may be 0.2 to 1 mm.

Each discharge orifice 46' is positioned in the vicinity of the associated major cutting edge 28', i.e. it may be spaced from the associated major cutting edge 28' by a distance that may be equal to a dimension of the discharge orifice 46'.

Each discharge orifice 46' may form the exit of a curved channel 46' connected to the at least one coolant duct 78' in the drill tip.

Each arrangement may include 3 to 6 discharge orifices to increase the total flow area. This means that for a drill tip with two major cutting edges there will be not less than six discharge orifices and not more than 12 discharge orifices.

The arrangement may be straight or substantially straight. However, if the tool tip is made for or on a ball nose end mill, or similar, the row may follow a curved path of a major cutting edge but at a small distance therefrom. Then at least a portion of the row can be defined by a curvature that substantially matches the curvature of the major cutting edge.

All discharge orifices 46' in the arrangement may have the same diameter. All discharge orifices in the arrangement may be spaced from the associated major cutting edge 28' by the same spacing or distance. The distance G may be 5-15% of the drill tip diameter D'.

A majority of discharge orifices 46' may be located axially forwards of the line Y' intersecting the radially outer ends of the major cutting edges 28. The line Y' is typically perpendicular to the rotational axis A'. As seen in FIG. 2C there are four discharge orifices located axially forwards of the line and one discharge orifice located axially rearwards of the line while one discharge orifice is intersected by the line.

The rake face 24' is intersected by the line Y'.

Table 1 that is disclosed above is true also for the second embodiment; at least for drill diameters of 10 to 20 mm.

The drill tip may have two rows (not shown) of discharge orifices in the arrangement exiting in the same flute. The two rows may then extend parallel to each other. The number of holes may then be twice as many as compared with only one row. The discharge orifices may then be staggered to maintain durability of the drill tip.

At least one discharge orifice may be located in each first gash surface 36' to improve central flushing. At least one discharge orifice may be located axially below the intermediate cutting edge.

The discharge orifices in an arrangement may be positioned evenly, such as at the same distance from adjacent orifices, or unevenly.

Suitably, the drill tip 16' is made through precision casting or additive manufacturing such as metal 3D printing processes which use binders, or fully dense metal processes like selective laser sintering (SLS) or direct metal laser sintering (DMLS).

The drill tip may have another design as long as it can be secured to the front of a drill body by a bayonet coupling and/or a screw coupling.

Tool life generally increases with increase in coolant supply pressure. This can be attributed to the ability of the high-pressure coolant to lift the chip and gain access closer to the cutting interface. This action leads to a reduction of the seizure region, thus lowering the friction coefficient, which in turn results in reduction in cutting temperature and cutting forces. Preferably the pressure used in the discussed embodiments is above 5 bar, preferably above 30 bar coolant pressure.

In one embodiment of the present invention, a first layer is a multilayered structure varying (Ti,Al)N layer. The individual layers of the first and/or second layers comprises metal nitrides where one or more of the metal elements are selected from titanium (Ti), aluminum (Al), silicon (Si), chromium (Cr), niobium (Nb), hafnium (Hf), vanadium (V), tantalum (Ta), molybdenum (Mo), zirconium (Zr), tungsten (W), preferably from titanium (Ti), aluminum (Al), silicon (Si), chromium (Cr). The suitable total thickness of the first and second layer respectively is determined by the chemical composition of the coating as well as by the exact geometry of the drill.

The tool tip 16 or 16' may be given different designs depending on the area of application.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "lower", "top", "bottom", "front", "forward", "rear" and "rearwards" refer to features as shown in the current drawings and as perceived by the skilled person. The expression "in the rake face" is understood to mean being located in the rake face that is about the axially forwardmost 4 millimeters of the associated chip flute. The term "associated" is here meant to be synonymous to closest, connected, adjacent, adjoining, or similar. The term "tool tip" is exchangeable with terms like "drill tip" and "end mill tip" in the current text.

While this invention has been illustrated and described in accordance with preferred embodiments, it is recognized that variations and changes may be made therein without departing from the invention as set forth in the claims.

The invention claimed is:

1. A one-piece tool tip being integral with or being configured to be removably secured to a tool body, and configured to machine a metal object, the tool tip comprising:
   a tool tip diameter, a rotational axis and at least one coolant duct;
   at least one major cutting edge formed at an intersection of a rake face and a first major flank, the rake face forming part of a chip flute, the at least one coolant duct being configured to be in flow communication with discharge orifices located exclusively in the tool tip; and
   an arrangement of a row of two or more discharge orifices located exclusively in the rake face of the at least one major cutting edge, wherein the arrangement extends at a non-zero angle relative to the rotational axis, wherein the tool tip has at least two major cutting edges, and wherein a majority of the discharge orifices are located axially forwards of a line intersecting radially outer ends of the at least two major cutting edges.

2. The tool tip according to claim 1, wherein the arrangement follows a substantially straight path or a curved path having three or more discharge orifices in the rake face of the at least one major cutting edge.

3. The tool tip according to claim 1, wherein the arrangement extends along or parallel to the at least one major cutting edge in the rake face.

4. The tool tip according to claim 1, wherein the arrangement is defined by a line intersecting at least two or three discharge orifices.

5. The tool tip according to claim 1, wherein a line intersecting at least three discharge orifices is spaced from the at least one major cutting edge by a distance.

6. The tool tip according to claim 5, wherein the distance is 5-15% of the tool tip diameter.

7. The tool tip according to claim 1, wherein each discharge orifice has a diameter that is 5-15% of the tool tip diameter.

8. The tool tip according to claim 1, wherein each discharge orifice is spaced from a respective major cutting edge by a distance that is equal to a diameter of the discharge orifice.

9. The tool tip according to claim 1, wherein each discharge orifice forms an exit of a curved channel connected to an at least one receiving end or coolant duct.

10. The tool tip according to claim 1, wherein the arrangement includes 3 to 6 discharge orifices.

11. The tool tip according to claim 1, wherein all of the discharge orifices in the arrangement have a same diameter.

12. The tool tip according to claim 1, wherein all of the discharge orifices in the arrangement are spaced from a respective major cutting edge by the same distance.

13. The tool tip according to claim 1, wherein the tool tip is fused to the tool body such that the rear end of the tool tip and a front end of the tool body are joined together physically, by melting or heating, to form a twist drill or helix drill.

14. The tool tip according to claim 1, wherein the tool tip is configured to be detachably secured to the tool body by a coupling such that at least one coolant duct in the tool tip aligns with the at least one coolant duct in the tool body.

* * * * *